Aug. 25, 1936.　　　A. F. SPITZGLASS　　　2,052,511
CONTROLLING AND RECORDING INSTRUMENT
Filed Sept. 17, 1930　　　2 Sheets-Sheet 1
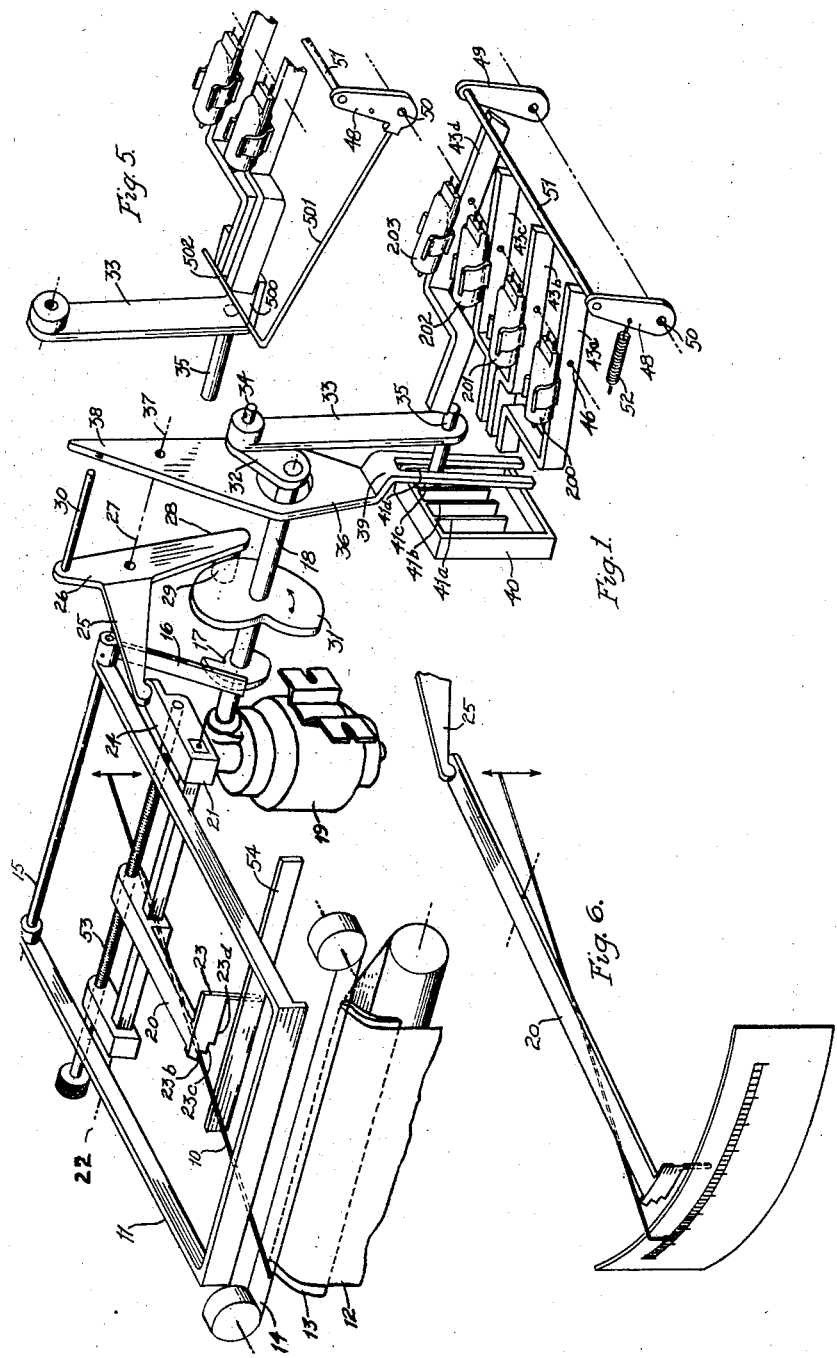
Inventor
Albert F. Spitzglass
per James B. Lewis
Attorney Aug. 25, 1936.  A. F. SPITZGLASS  2,052,511
CONTROLLING AND RECORDING INSTRUMENT
Filed Sept. 17, 1930  2 Sheets-Sheet 2
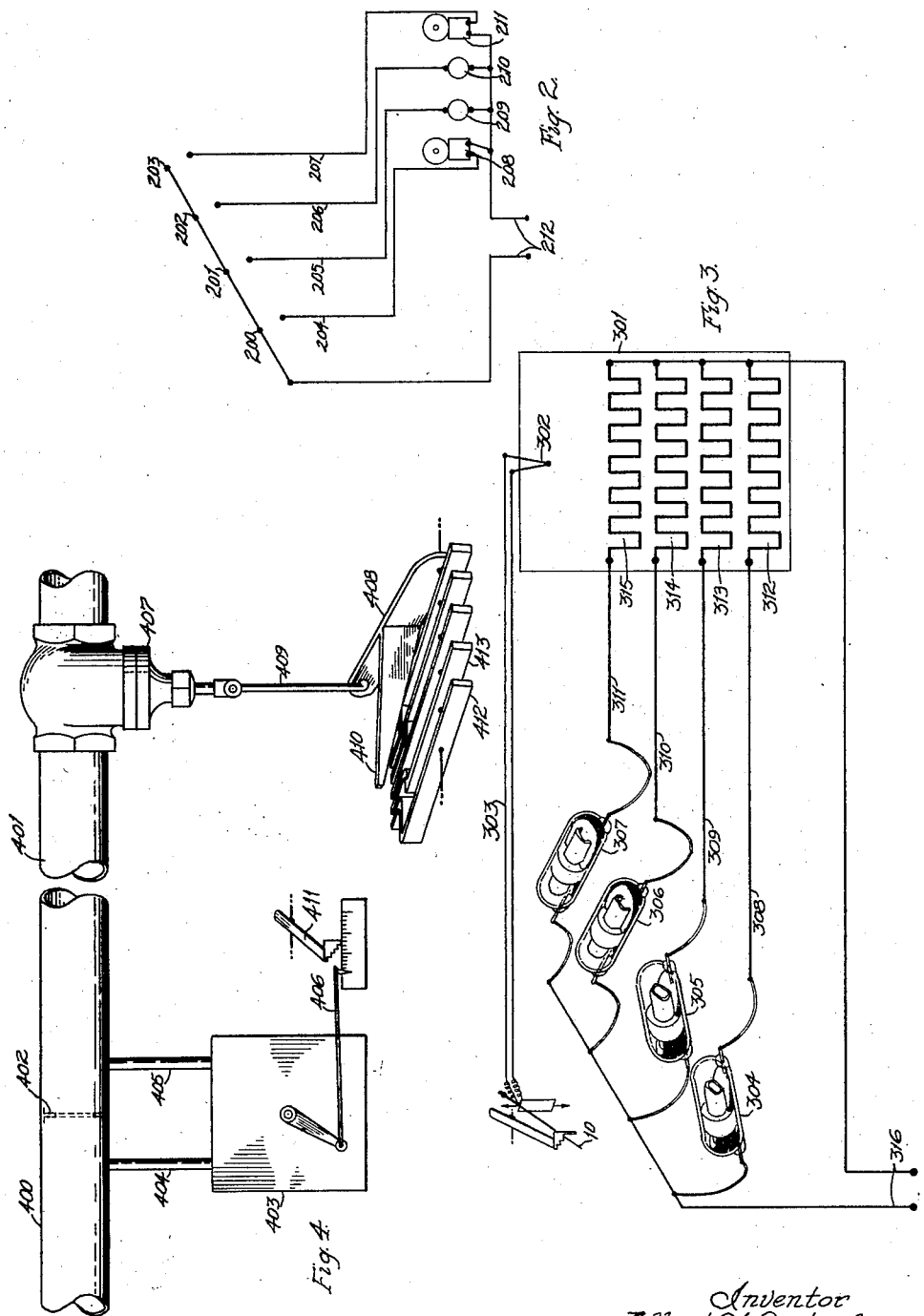

Patented Aug. 25, 1936

2,052,511

UNITED STATES PATENT OFFICE 2,052,511

CONTROLLING AND RECORDING INSTRUMENT

Albert F. Spitzglass, Chicago, Ill., assignor, by mesne assignments, to The Brown Instrument Company, Philadelphia, Pa., a corporation of Pennsylvania Application September 17, 1930, Serial No. 482,516

47 Claims. (Cl. 200—56)

This invention relates in general to a system of and apparatus for recording and controlling physical, electrical, chemical, mechanical or other quantities and their changes or variations.

The present invention aims to provide an apparatus for recording the value of quantities and for controlling said quantities to maintain predetermined or other conditions in said quantities.

In many types of recording devices the condition of the apparatus is recorded or indicated by a delicate needle, which, owing to its weak construction and action, cannot be employed to operate means for regulating the apparatus whose condition is shown by the needle or indicator, especially since it is practically impossible to cause such a weakly acting indicator to perform any work, even if it could be done without impairing its accuracy.

One type of such prior devices employs a weakly acting needle of an indicating device to close contacts of an electric circuit, for performing a controlling function, either by depressing the contact mechanism against the needle or by depressing the needle against the contact operating means. In either case considerable pressure is exerted on the pointer, which is objectionable because of the strain put on the needle and the pivots or bearings thereof resulting in excessive wear on the pivots with consequent inaccuracy of indication.

One object of the present invention is to provide a practical recording controller whose operation may be accurately controlled by a needle, pointer or indicator, of the class before mentioned, without impairing the accuracy or sensitivity thereof.

Another object of the invention is to provide a controller wherein the sensitive index of a responsive device controls the actuation of a power device which performs the controlling or regulating function, the controlling function being accomplished without exertion or effort on the part of the index beyond what is required to bring it to the point at which the regulation is to take place.

A further object of the invention is to provide an apparatus wherein the movable member of a recorder controls the closure of a path over which mechanical energy may be transmitted to perform a suitable control operation.

A still further object of the invention is to provide a power driven control mechanism controlled in its action by a sensitive index for controlling a quantity or maintaining a predetermined condition of said quantity.

Additional objects and advantages of the invention will be apparent from the following detailed description taken in connection with the accompanying drawings, in which:

Fig. 1 is a perspective elevation, more or less diagrammatic, of a recorder and controller apparatus, which is the subject matter of this invention.

Fig. 2 is a fragmentary view showing the adaptation of the invention to the control of signals.

Fig. 3 is a perspective showing the adaptation of the invention for the control of an electrical heating unit.

Fig. 4 is a perspective showing the adaptation of the invention for controlling the flow of fluid through a conduit.

Fig. 5 shows a modification of the actuator of the invention.

Fig. 6 shows the adaptation of the invention to an indicator.

Referring to the explanatory embodiment of the invention illustrated in Fig. 1, 10 is the needle, pointer or indicator of any electrical, mechanical, chemical or other instrument and is deflectable to the right or left, as viewed in Fig. 1, in response to any change to be recorded or in response to any change which is to exercise any control or actuate any mechanism.

Cooperating with the needle or pointer is a depressor 11 adapted to intermittently or periodically depress said needle against a traveling record sheet 12, which passes over a suitable anvil 13. A marking medium 14 is provided between the record sheet 12 and the pointer 10 for the purpose of permitting an impression to be made, such impression being made on the record sheet by oscillation of the depressor.

The depressor comprises a frame pivoted at 15 and provided with an arm 16 cooperating with a cam 17 mounted upon the shaft 18 driven by a power device 19; said power device may be of any convenient form and may be either of the intermittent or continuous operating type. As the cam is rotated by the power device 19 the arm 16 operates the depressor 11 to intermittently depress the needle against the record receiving sheet to make a record of its position thereon; it being understood, of course, that the record sheet and the marking medium are driven by well-known mechanism employed in recording devices.

A lever 20, mounted on a frame 21 pivoted to turn about the pivot 22, is caused to vibrate up and down to cause an angularly disposed needle engaging portion 23 on its free end, to dip into and out of the path of the needle. The portion 23 is intended to be intercepted by the needle, whereby the lever 20 is arrested and the desired regulation effected. It will be seen from the ensuing description that a mere touch of the lever 20 upon the needle is sufficient to effect a control operation, and for convenience the lever or its extending portion is termed a tactor. The tactor may be made in a variety of forms and need not necessarily be oscillatory, and it may be operated repeatedly by any kind of prime mover.

As an illustration, the tactor is shown as operated by the power device 19. The frame 21 is provided with an arm 24, which may be an extension of one side of the frame 21. Said arm is adapted to be contacted by one arm 25 of a bell crank 26, said bell crank being pivoted as at 27, and provided with a depending arm 28 having a cam engaging roller 29 pivoted thereto and a selector engaging pin 30 provided on the upper extension thereof. The roller 29 engages a suitable cam 31 mounted on the shaft 18 driven by the motor 19.

The shaft 18 is provided with a crank 32 movable therewith, said crank pivotally supporting and operating an actuator link 33 as at 34, said actuator being provided with an operating member 35 in the form of an elongated pin.

As above explained the pin 30, carried by the arm 28 of the bell crank, engages a selector. The selector takes the form of a rocking bar 36 pivoted as at 37, having an upper pin engaging portion 38 and a lower elongated furcated portion 39. Adjacent the furcated portion 39 a guide element 40 is mounted in relatively fixed position and provided with a series of slots or guides 41a, 41b, 41c, and 41d forming paths for the travel of the member 35, which is prolonged to move freely between the guides as the shaft 18 rotates.

A plurality of control members are provided which may control either electrical or mechanical mechanism for performing control operations as hereinafter explained. The control members may take the form of levers 43a, 43b, 43c, and 43d pivoted as at 46. The forward end of said levers terminate adjacent and opposite the guides 41 in position such that they will be raised by the pin 35 as it ascends the guide common to a particular lever. The rear ends of the levers are preferably of the same length and are sloped as shown in Fig. 1 of the drawings.

Under certain conditions of operation it may be desirable to maintain one or more of said levers in raised position, and to that end a latch is provided. This latch comprises end pieces 48 and 49 pivoted as at 50 and connected by a lever engaging rod 51 adapted to abut against the sloping ends of the levers when they are in normal or lowered position and to rest upon the top or toe of the levers when they are in raised position to maintain them in that position. The latch is urged toward the levers by a spring 52, or other suitable means. The arrangement is such that the raising of a lever cams the rod 51 outwardly until the rear end thereof passes beneath the rod, which then snaps forward over the top of the lever and maintains said lever in raised position. After a lever has been raised and latched in raised position it remains in that position as long as the pin 35 travels the guide common to that lever. However, when the pin travels either one of the other paths, another lever will be raised, and the raising of the latter lever operates to release the previously raised lever in the following manner. As the other lever is raised the sloping portion of the rear end thereof pushes the rod 51 outwardly thereby releasing the toe of the raised lever, permitting said lever to drop to normal position and continued raising of the moving lever causes the rod 51 to snap over the toe thereof and maintain said lever in raised position. This sequence of operation is continuous during operation of the device.

As shown in the drawings, a number of guides are provided for the pin 35, and an equal number of levers are also provided. This arrangement is such that when the pin travels one of the paths formed by the guides a control member or lever will be actuated to perform a suitable control operation. The number of the levers and guides may be varied to suit the particular requirements of the installation. It will also be noted that the needle engaging portion 23 of the tactor is provided with a series of steps 23b, 23c, 23d, such that the extent of movement of the tactor is determined by the step engaged by the needle.

In operation the shaft 18 is continuously rotated by the motor 19. As the shaft rotates the depressor is raised and lowered by the cam 17 to make a record upon the traveling record sheet 12. At the same time the tactor 20 is also vibrated into and out of the path of the needle, and the movements of the depressor and tactor are synchronized so that the tactor crosses the path of the needle immediately after the needle is depressed against the record sheet. This is advantageous, since the needle is held in position and prevented from swinging away from the tactor should the tactor slightly engage the edge thereof.

Assuming that the device is set in operation and the needle registers with the zero position on the record. As the shaft 18 rotates, the roller 29 of the bell crank 26, riding upon the periphery of the cam 31, traverses the dwell therein lowering the tactor across the path of the needle. Since the needle is well below the tactor, said tactor will make a complete oscillation, whereupon the selector engaging pin will contact with the selector and position the same to cause the pin 35 to travel guide 41a of the element 40, and raise lever 43a to latched position. As long as the needle is below the tactor, the pin 35 will continue to travel up and down in the guide 41a and the lever 43a will remain in raised position. It may be noted at this point that the movements of the pin and selector are so synchronized that the pin 35 is approximately in its lowermost position, below the end of the guides, when the selector is positioned by the selector engaging pin 30.

Assuming now that the pointer has moved to the right in response to the condition to which it is responsive such that it is now in the path of the tactor. As the shaft rotates the tactor will be lowered, and instead of making a complete oscillation will be intercepted by the pointer contacting with the step 23b thereof. This limits the movement of the tactor and the selector engaging pin moves the selector through less distance than previously moved, and the pin 35 will now travel path 41b. As the pin 35 moves upwardly in this path it picks up the lever 43b and raises the same to elevated position. Raising of the lever 43b pushes the latch rod 51 outwardly sufficiently to release the previously raised lever 43a allowing said lever to drop to normal or lowered position. The lever 43b remains in raised position as long as step 23b contacts with the needle. Upon further deflection of the needle to the right, different steps of the tactor will be engaged thereby, the movement of the tactor will be correspondingly limited and at each step of interception the selector will be so positioned that the pin 35 will travel a different guide and a different control lever will be raised, and the previously raised lever will be lowered as previously explained.

Adjustment of the point of control may be effected by setting the tactor in such position that it intercepts the path of the needle at the predetermined point on the chart where the control is to be effected. To this end the tactor is provided with a screw threaded extension cooperating with the hand operated screw 53 rotatably mounted in the frame 21. By manipulating this screw the tactor may be positioned at any desired point.

In the embodiment illustrated in Fig. 1 the tactor beats across the path of the needle at a point removed from the anvil, against which the needle is depressed by the depressor and an auxiliary support 54 is provided adjacent the end of the tactor so that, when the needle is engaged by the tactor, the weight of the tactor will be carried by this support rather than by the needle. This feature, while not absolutely necessary, prevents any possibility of flexing of the needle.

An adaptation of the invention to the control of signals is illustrated in Fig. 2 where the signals are arranged to be operated by operation of the levers. As shown in Fig. 1, circuit closers 200, 201, 202 and 203, in the form of mercury switches, are mounted respectively on the control levers 43a, 43b, 43c and 43d to be opened and closed by the elevation and lowering of said levers. In this arrangement the circuit closers 200, 201, 202 and 203 are connected respectively thru leads 204, 205, 206 and 207 with the signals 208, 209, 210, and 211, and the signals and circuit closers are connected in parallel with the main supply line 212 energized from a suitable source of electrical energy, it being understood that the pointer 10 is responsive to the condition to be signalled.

Upon operation of the device the lever 43a will be elevated as previously described, thereby closing the circuit through switch 200, lead 204, and signal 208. This signal indicates that the device to be controlled is "on", but that the condition thereof is below the desired point. As the pointer swings up scale, in response to changes in the condition, lever 43b will be raised and lever 43a lowered, as before described. Raising of lever 43b closes the circuit through switch 201, lead 205 and signal 209. This signal indicates that the condition is approaching the desired point, which in this arrangement is preferably between the points represented by signals 209 and 210. Operation of signal 210 indicates that the condition is beyond the desired point, and signal 211 indicates a dangerous condition. While both audible and visible signals are shown, it is to be understood that they all may be either visible or audible or that the order shown may be reversed without departing from the spirit of the invention.

The signals may be located at any designated point either near the recorder structure or near the point where the control is effected or both, in which latter case the signals are duplicated and connected in parallel with each other.

In certain installations it may be desirable to operate two or more signals simultaneously. This object may be accomplished as shown in Fig. 5 by the provision of a lift 500 for the actuator 33 of sufficient length to pick up the requisite number of levers.

Where two or more levers are raised and latched simultaneously, as by the lift 500, latch operating means are necessary to insure unlatching of the raised levers. Such means may comprise a rod 501 secured to end piece 48 and provided with a laterally extending arm 502 cooperating with the lift 500 in such manner that the rod 51 is pushed outwardly, to free the levers, at each reciprocation of the lift. This unlatching operation insures release of the levers beyond the end of the lift 500 while those levers above the lift are retained in elevated position. In Fig. 5 the lift is illustrated as elevating two control levers, but it is to be understood that the lift may be arranged to pick up any number desired.

Referring now to Fig. 3 the instrument is shown as connected to operate a heating unit 301. In this case the thermocouple 302 is connected through conductors 303 to operate the pointer 10 through actuation of a galvanometer or millivoltmeter armature. The mercury switch 304 is connected in series through the conductor 308 with the resistor 312. The mercury switch 305 is connected in series through conductor 309 with the resistor 313. Likewise switches 306 and 307 are connected in series through conductors 310 and 311 with resistors 314 and 315 respectively, and the resistors and switches are connected in parallel with a source of supply 316. As in Fig. 5, the actuator is provided with a lift of sufficient length to raise all of the levers 43, upon which the switches 304 to 307 are respectively mounted, to energize the resistors 308 to 315.

As previously described, when the device is started up with the pointer down scale the tactor makes a complete oscillation, thereby moving the actuator to the extreme left, as viewed in Fig. 1, and with the lift of sufficient length to subtend the ends of all of the levers 43, said levers will be raised and latched in raised position. This operation energizes the resistors connected with the raised switches and the unit begins to heat up with a consequent up scale movement of the pointer 10. When the pointer moves up sufficiently to be intercepted by the tactor, this, as previously described, will cause the selector to position the actuator such that switch 304 will be released and will fall to open position thereby cutting out resistor 312. Should the heat continue to increase, the pointer will deflect sufficiently to be intercepted by the second step on the tactor, and the switch 305 will be released to fall to open position thereby cutting out resistor 313. This action will continue until the heating unit reaches the desired temperature wherein an adequate number of switches will be maintained closed and the resistors connected therewith will supply sufficient heat to maintain the temperature uniform. Should the temperature drop for any cause whatever, the needle will deflect down-scale and the adjacent switch will be moved to closed position by the actuator to bring the temperature back to the normal position. As illustrated in Fig. 3 switches 306 and 307 are in closed position, while switches 304 and 305 are in the open position. As will be apparent from this illustration this device is very well adapted to control the temperature of a heating unit.

The instant device is also well adapted to the control of flowing fluids. As an example of this adaptation Fig. 4 represents the device adapted to the proportioning of the flow of two fluids. The proportioning of fluids is desirable in many installations, particularly in the supply of air and gas to a gas-fired furnace or to the mixing of two liquids as in chlorination of water, and many other installations. As illustrated in Fig. 4 the primary flow through conduit 400 is adapted to exert a control on the secondary flow through conduit 401. The conduit 400 is provided with a pressure difference producing device 402, shown as an orifice plate. The meter 403 is connected to the conduit at opposite sides of the orifice plate through connections 404 and 405, the meter being responsive to the differential pressure produced by the flow through the orifice and provided with mechanism for operating the pointer 406 in accordance with that flow. This pointer 406 takes the place of pointer 10 in Fig. 1, otherwise the mechanism of Fig. 1 applies to this illustration. Control of the secondary flow through part 401 is effected by means of a valve 407, which may be either of the balanced type or any other suitable type controlled by valve lever 408 connected thereto by a link 409. The valve lever 408 is provided with a laterally extending arm 410 and in this particular illustration five levers, similar to levers 43 of Fig. 1, are utilized to operate said lever 408, and the five levers are adapted to be operated in the same manner as are the levers of Fig. 1. That part of the arm 410 with which the levers coact may be shaped such that the desired degree of opening and closing of the valve by each lever is obtained. Each of the levers are operated through substantially the same angle. Such being the case the proper degree of valve operation may also be secured by making the arm 410 straight and spacing the levers from each other so that the effective stroke thereof on the arm 410 produces the correct operation of said valve.

In operation when the flow through conduit 400 is started, the pointer 406 being down scale, the tactor will make a complete oscillation with the result that lever 412 will be elevated in a manner similar to the elevation of the lever 43a in Fig. 1. The lever 412 when raised contacts with the arm 410 to raise the lever 408 through a small angle which slightly opens the valve 407. As the flow through conduit 400 increases the pointer 406 deflects up scale until the tactor is further intercepted. This interception of the tactor causes the actuator pin 35 to travel the adjacent path 43b and elevate lever 413. This lever opens the valve wider than the previously operated lever 412, which will be unlatched, and permitted to fall to normal position. As the flow through the conduit 400 varies a different lever will be actuated and the valve 407 accordingly opened or closed to maintain the proper proportionality between the primary and secondary flows.

From the foregoing it will be apparent that the sensitivity of the index, pointer or needle is not impaired by the control mechanism, that the control operation is accomplished by powerful mechanism without exertion or effort on the part of the index and that the device is capable of a wide variety of adaptations.

It is to be understood that the invention is not limited by the exact embodiments of the device shown, which are merely by way of illustration and not limitation, as various and other forms of the device will, of course, be apparent to those skilled in the art without departure from the spirit of the invention or the scope of the claims.

I claim:

1. In a control system, a freely swinging actuator link reciprocable lengthwise along one of a plurality of fixed paths, and a selector mounted on a fixed pivot and shifted more or less on said pivot in response to variations to be controlled and serving when so shifted as a fixed guide for selecting the path for said actuator.

2. In a control system, a guide member providing a plurality of paths, an actuator link travelable lengthwise along any one of said paths, and a selector controlled according to the change to be controlled for selecting the path in said guide for said actuator.

3. In a control system, a fixed member provided with a plurality of parallel slots, an actuator reciprocable along said slots, and a selector mounted on a fixed pivot and shifted automatically on its pivot to select the proper slot for said actuator.

4. In a control system, a plurality of guides, an actuator movable in said guides, a plurality of control levers, there being a guide for each of said levers, and a selector having a guide slot embracing a part of the actuator and automatically movable to shift the actuator with respect to the guides to select the proper guide for said actuator, whereby the proper lever will be operated as the actuator moves along the guide selected.

5. In a control system the combination with movable index responsive to variations in a condition to be controlled, of a periodically operating member for engaging said index in certain positions thereof, a plurality of steps upon said member, said different steps being engaged according to the extent of deflection of said index, a plurality of guides, there being one more guide than steps, an actuator adapted to move along said guides, control levers equal in number to the number of guides and operated by said actuator, and means controlled by said member adapted to select the guide for the actuator, the guide it selected depending upon the extent of deflection of said needle.

6. In a control device, the combination with a needle movable in response to a change, of an oscillatable member having a stepped needle engaging portion whereby extent of oscillation of said member is determined by degree of deflection of said needle, a series of guides, there being one more guide than steps on said member, a series of control elements equal in number to the guides, a power driven actuator reciprocable along said guides for operating said control elements, a selector for said actuator, and means cooperating with said oscillatable member for selecting the guide for said actuator.

7. In a control device, the combination with a pointer movable in response to changes in a condition to be controlled, of a periodically operating depressor for depressing the pointer, means for actuating said depressor, a series of parallel control levers each carrying a mercury switch, means for selectively rocking one or more of said levers when the depressor is operated, and means operable in accordance with the position of said pointer to select the number of levers to be operated.

8. The combination with an index movable in response to a change, of a plurality of control levers, mechanical means controlled by said index and including a single member adapted to contact said index for selectively actuating said levers and means for retaining said actuated lever in operative position.

9. The combination with a movable index responsive to variations of a condition, of a plurality of control levers, mechanical means including a single member adapted to contact said index and controlled by extent of deflection of said index for actuating said levers, a latch for retaining said actuated levers in operative position, and means operated by the actuation of another lever for releasing the previously operated lever.

10. Control apparatus including a plurality of control levers, a latch for retaining said levers in operative position after they have been raised to that position, a member deflectable in response to a change, selective means controlled by said member and including a single part adapted to contact said member for raising one of said levers, and means operated by the subsequent raising of another of said levers for releasing the previously raised lever.

11. Control apparatus comprising a plurality of control elements, means for selectively actuating simultaneously different numbers of said elements, and a selector device having an ungraduated selecting edge adapted for engagement by said means and set automatically according to the condition to be controlled and which varies the action of said means to determine the number of control elements actuated.

12. Control apparatus comprising a plurality of switches, means for selectively actuating simultaneously different numbers of said switches, and a selector device having an ungraduated selecting edge adapted for engagement by said means and set automatically according to the condition to be controlled and which varies the action of said means to determine the number of switches actuated.

13. Control apparatus comprising a plurality of control elements, means for selectively actuating simultaneously different numbers of said elements, a selector device set automatically according to the condition to be controlled and which varies the action of said means to determine the number of control elements actuated, and retaining means arranged to hold the actuated elements in active position until a different number of elements is actuated and then to release the first elements and hold said different elements in active position.

14. Control apparatus comprising a plurality of switches, means for selectively actuating simultaneously different numbers of said switches, a selector device set automatically according to the condition to be controlled and which varies the action of said means to determine the number of switches actuated, and retaining means arranged to hold the actuated switches in "on" position until a different number of switches is actuated and then to release the first switches and hold said different switches in "on" position.

15. Control apparatus comprising a plurality of pivoted control levers, an actuator arranged for operative engagement with different numbers of said control levers, and a selector having an ungraduated selecting edge adapted for engagement by said actuator and set according to the condition to be controlled and which is arranged to predetermine the number of levers engaged by said actuator.

16. Control apparatus comprising a plurality of pivoted control levers, an actuator having a part shiftable relatively thereto and which is arranged for operative engagement with different numbers of said control levers, and a selector set according to the condition to be controlled and which is arranged to shift said part to predetermine the number of levers operated by said actuator.

17. Control apparatus comprising a plurality of pivoted control levers, an actuator arranged for operative engagement with different numbers of said control levers, a selector set according to the condition to be controlled and which is arranged to predetermine the number of levers engaged by said actuator, and a latch device common to said levers and automatically holding in actuated position those moved to that position until the actuator moves a different number of levers to actuated position.

18. Control apparatus comprising a plurality of pivoted control levers, an actuator arranged for operative engagement with different numbers of said control levers, a selector set according to the condition to be controlled and which is arranged to predetermine the number of levers engaged by said actuator, and a latch device common to said levers and automatically holding in actuated position those moved to that position and released by the movement of a different number of levers to actuated position.

19. Control apparatus comprising a bank of pivoted levers each carrying a mercury switch operated by rocking of its lever, and means set automatically according to the condition to be controlled and arranged to rock different numbers of said levers.

20. Control apparatus comprising a bank of pivoted levers each carrying a mercury switch operated by rocking of its lever, a power-operated actuator adapted to rock one or more of said levers, and a selector set automatically according to the condition to be controlled and interengaging said actuator with one or more of the levers selectively.

21. Control apparatus comprising a bank of pivoted levers each carrying a mercury switch operated by rocking of its lever, a power-operated actuator, a selector set automatically according to the condition to be controlled and interengaging said actuator with the levers selectively, and automatic latching means locking the levers actuated on each cycle of the actuator until the next cycle takes place.

22. Control apparatus comprising a bank of independently-movable pivotally-mounted mercury switches, an actuator for tilting said switches, and an automatic selector for predetermining the number of switches to be tilted on each stroke of the actuator.

23. Control apparatus comprising a bank of independently-movable pivotally-mounted mercury switches, an actuator for tilting said switches, an automatic selector for predetermining the number of switches to be tilted on each stroke of the actuator, and an elongated latching device for locking in "on" position the switches tilted to that position by the actuator on each stroke.

24. Control apparatus comprising a bank of independently-movable pivotally-mounted mercury switches, an actuator for tilting said switches, an automatic selector for selectively predetermining the switches to be tilted on each stroke of the actuator, and an elongated latching device for locking in "on" position the switches tilted to that position and simultaneously releasing those not selected by the selector.

25. Actuating mechanism for a control apparatus comprising a bank of pivoted levers having their ends adjacent each other, a power-reciprocated actuator having a guided part and having a lever-engaging part, a stationary device adjacent the actuator having a guide corresponding to each lever and so arranged that when the guided part is positioned therein the actuator will operate the corresponding lever through said lever-engaging part, and an automatic selector predetermining the guide which receives said guided part.

26. Actuating mechanism for a control apparatus comprising a bank of pivoted levers having their ends adjacent each other, a power-reciprocated actuator having a lever-engaging part adapted to engage one or more of said levers, and an automatic selector predetermining the number of levers engaged by said part.

27. Actuating mechanism for a control apparatus comprising a bank of pivoted levers, a lengthwise-reciprocated actuator arranged to be shifted laterally to engage different levers, mechanism engaging one end of said actuator for reciprocating the same, and an automatic selector engaging the other end of said actuator to shift the actuator laterally without interfering with its lengthwise movement.

28. Control apparatus comprising an automatically set actuator, a plurality of levers selectively actuated thereby, a selector having an ungraduated selecting edge adapted for engagement by said actuator to select the lever actuated by the latter and a latch for holding each lever when so actuated and which is arranged to be released automatically by subsequent actuation of a different lever.

29. Control apparatus comprising an automatically set actuator, a plurality of mercury switches selectively tiltable to "on" position thereby, and a latch for holding each switch when so tilted and which is arranged to be released automatically by subsequent tilting of a different lever.

30. Control apparatus comprising an automatically set actuator, a plurality of levers selectively actuated thereby, a selector having an ungraduated selecting edge adapted for engagement by said actuator to select the lever actuated by the latter and a latch for holding each lever when so actuated and which is arranged to be released automatically by subsequent actuation of a different lever, said levers and said latch having camming engagement so that subsequent operation of a different lever releases the latch.

31. Selector mechanism for an instrument control comprising a lever having an elongated slot at its free end, a movable stop for automatically setting said lever in different positions, a power-operated actuator having a part reciprocated in said slot and which is moved in different paths according to the setting of the lever, and control means variably actuated by the actuator according to the path in which said part is reciprocated.

32. Selector mechanism for an instrument control comprising a member having an elongated guide slot therein, means for automatically setting said member in different positions, a power-operated actuator having a part reciprocated in said slot and which is moved in different paths according to the setting of said member, and control means variably actuated by the actuator according to the path in which said part is reciprocated.

33. Selector mechanism for an instrument control comprising an actuator including a power-reciprocated link having a transversely-extending member at its end, a selector which is automatically set in different positions and which has a slot guidingly embracing said member and causing it to move in different paths according to the setting of the selector, and control means variably actuated by said member according to the path in which it moves.

34. Selector mechanism for an instrument control comprising an actuator including a crank having pivoted thereon a reciprocable link having a transversely-extending member at its free end, a selector which is automatically set in different positions and which has a slot guidingly embracing said member and causing the link to be moved by the crank in different paths according to the setting of the selector, and control means variably actuated by said member according to the path in which the link moves.

35. Selector mechanism comprising a selector member having a guide slot, means for shifting said member to change the position of said slot, and a power-operated control actuator having a guide part embraced by said slot and moved in different paths according to the setting of the selector member.

36. In a control system, an element having an ungraduated selecting edge and oscillatable to different positions in response to a change, and means selectively adjusted by said edge and capable of exerting one of a plurality of controlling effects controlled in its operation by the extent of oscillation of said element edge and including a plurality of control devices one of which is shifted to its active position to correspond to each of the different positions of said element edge and means for retaining the device so shifted in its active position until another of the devices is shifted to active position.

37. In a control system, a member movable to different degrees in response to a change to be controlled, control means including an actuator reciprocable along one of a plurality of fixed paths, and a selector for guiding the actuator and which is shifted in response to different positions of said member to select the path for said actuator and which has an ungraduated surface guiding the actuator in the selected path.

38. In a control system, a plurality of control devices, a power driven actuator for operating said devices, said actuator operating in a single plane and being adjustable in one direction to select the device to be operated, and movable in another direction to actuate the device selected, and selector means for adjusting said actuator in said one direction, means for retaining the actuated device in active position, and means for releasing the retaining means upon actuation of another device by said actuator.

39. In a control system, a plurality of control levers, an actuator for actuating said levers, said actuator operating in a single plane and being adjustable in one direction to select the device to be operated, and movable in another direction to actuate the device selected, and selector means for adjusting said actuator in said one direction, and means for retaining each actuated lever in its actuated position until another lever is actuated and then releasing it.

40. In control apparatus, the combination of a plurality of control elements arranged side by side in a row and each adapted for operative movement transversely to said row, a rotating crank shaft extending transversely to, and laterally displaced from said row, a crank pin carried by said shaft, an actuator pivotally connected to said crank pin, and comprising an element engaging part movable across said row and thereby engaging and actuating one or another of said elements according to the position of said part along said row, and selecting means responsive to a controlling condition for adjusting said actuator part into different positions along said row in accordance with different values of said condition.

41. In control apparatus, the combination with means providing a plurality of side by side guideways, of a reciprocating actuator adjustable relative to said guideways when at one limit of its reciprocatory movement into position for engagement with and movement along one or another of said guideways during its subsequent reciprocatory movement, selective means responsive to a controlling condition for adjusting said actuator into position for engaging one or another of said guideways in accordance with the value of said condition, and control means actuated by said actuator in selective accordance with the guideway along which the actuator moves.

42. In control apparatus, the combination of a plurality of control elements arranged side by side in a row and each adapted for operative movement transversely to said row, a rotating crank shaft extending transversely to, and laterally displaced from said row, a crank pin carried by said shaft, means providing a plurality of side by side guideways arranged in a row alongside the first mentioned row and each extending transversely to the first mentioned row, an actuator pivotally connected to said crank pin, and comprising an element engaging part movable across, and thereby engaging and actuating an adjacent one of said elements, and comprising a guiding part adjustable into register with one or another of said guideways when the first mentioned part is at one side of the first mentioned row, and engaging with, and being guided by the guideway with which it is in register on a subsequent movement of the first mentioned part across the first mentioned row, and selecting means responsive to a controlling condition for adjusting said guide part into register with one or another of said guideways in accordance with the value of said condition.

43. In control apparatus, the combination of a plurality of control elements arranged side by side in a row and each adapted for operative movement transversely to said row, means providing a plurality of side by side guideways extending transversely to the said row at different points along the length of the latter, an element actuator, selecting means responsive to a controlling condition for adjusting said actuator into register with one or another of said guideways depending on the value of said condition, and means for moving said actuator along the guideway with which it is in register.

44. In control apparatus, the combination of a bank of control levers each biased for movement into a predetermined position and having operating lever parts arranged side by side in a row when the levers are all in their said predetermined positions, an actuating element periodically movable transversely to said row into engagement with one or another of said parts according to the adjustment of said actuator along said row, means responsive to a control condition for selectively adjusting said actuator along said row, and retaining means actuated on each actuation of said actuator to engage and hold each lever or levers then turned out of its predetermined position by said actuator against immediate return, and to release any lever previously held out of its predetermined position as a result of a preceding actuation of said actuator.

45. In control apparatus, the combination with a plurality of separately movable switch controlling elements each biased for movement away from a predetermined position, operating means for moving said members into their predetermined positions and periodically releasing them to permit their bias movements out of said positions, said operating means including a selector part and means responsive to a controlling condition for adjusting said selector into a position in which it will arrest the said bias movement of one or another of said members accordingly as said condition has one or another value.

46. In a control instrument, an element deflecting in accordance with changes in value of a controlling condition, a contactor adapted to engage said element, a plurality of mercury switch adjusting levers biased to move from a predetermined position into a second position, a movable selector positioned by said contactor and having a single selecting edge adapted in each of different operative positions to be engaged by a different one of said levers to prevent movement of the latter to its second position, means for holding said levers in said predetermined position against said bias and periodically releasing said levers for movement away from said position under said bias, and mercury switch control means subject to an adjustment on and in accordance with the adjustment of said levers when released, the adjustment of said mercury switch control means being maintained until a subsequent adjustment of said levers is effected with the said selecting edge in a different position.

47. In a control instrument, an element deflecting in accordance with changes in value of a controlling condition, a contactor adapted to engage said element, a plurality of mercury switch adjusting levers biased to move from a predetermined position into a second position, a movable selector positioned by said contactor and having a selecting edge adapted in each operative position to be engaged by at least one of said levers to prevent movement of the latter to its second position, means for moving at least two of said levers to and holding the latter in, said predetermined position against said bias and periodically releasing said levers for movement away from said position under said bias, and mercury switch control means subject to an adjustment on and in accordance with the adjustment of said levers when released; the adjustment of said mercury switch control means being maintained until a subsequent adjustment of said levers is effected with the said selecting edge in a different position.

ALBERT F. SPITZGLASS.